United States Patent
Ecker et al.

(10) Patent No.: US 11,127,005 B2
(45) Date of Patent: Sep. 21, 2021

(54) NETWORK AND METHOD FOR CLEARING POINT-OF-SALE TERMINAL PRE-AUTHORIZATIONS

(71) Applicant: The Toronto-Dominion Bank, Toronto (CA)

(72) Inventors: Jeffrey Aaron Ecker, Toronto (CA); Bryan Michael Gleeson, Bowmanville (CA); Igor Elkhinovich, Toronto (CA); Dmitri Rabinovich, Richmond Hill (CA); Adam Douglas McPhee, Waterloo (CA); Matta Wakim, Petersburg (CA); Kyryll Odobetskiy, Waterloo (CA); Arun Victor Jagga, Toronto (CA); John Jong-Suk Lee, Toronto (CA); Rakesh Thomas Jethwa, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

(21) Appl. No.: 16/847,075

(22) Filed: Apr. 13, 2020

(65) Prior Publication Data
US 2020/0242601 A1 Jul. 30, 2020

Related U.S. Application Data

(63) Continuation of application No. 15/724,249, filed on Oct. 3, 2017, now Pat. No. 10,657,529.

(51) Int. Cl.
*G06Q 20/40* (2012.01)
*G06Q 20/20* (2012.01)
(Continued)

(52) U.S. Cl.
CPC ....... *G06Q 20/40* (2013.01); *G06F 16/90335* (2019.01); *G06Q 20/023* (2013.01); *G06Q 20/204* (2013.01); *G06Q 20/405* (2013.01)

(58) Field of Classification Search
CPC combination set(s) only.
See application file for complete search history.

(56) References Cited

U.S. PATENT DOCUMENTS

| 7,499,889 B2 * | 3/2009 | Golan | G06Q 20/04 705/40 |
| 7,665,657 B2 * | 2/2010 | Huh | G06Q 20/108 235/379 |

(Continued)

FOREIGN PATENT DOCUMENTS

WO    WO13082190 A1    6/2013

OTHER PUBLICATIONS

Herbst-Murphy, Susan; "Clearing and Settlement of Interbank Card Transactions: A Mastercard Tutorial for Federal Reserve Payments Analysis", Federal Reserve Bank of Philadelphia, Discussion Paper, Payment Cards Center, Oct. 2013.

*Primary Examiner* — Peter Ludwig
*Assistant Examiner* — Michael Jared Walker
(74) *Attorney, Agent, or Firm* — Graham Patent Law

(57) ABSTRACT

A clearing network includes a server, a POS terminal, and a computer network interconnecting the server and the POS terminal. The sever is configured to receive account numbers over the computer network, determine that an occurrence of one of the account numbers in the plurality of account numbers exceeds a maximum limit, and via the computer network update the pre-authorization database with the account number. The POS terminal is configured to receive a pre-authorization request that includes an authorization amount and the account number, query the pre-authorization database with the account number, and after locating the (Continued)

account number in the pre-authorization database from the query (a) confirm that the authorization amount is not greater than an authorization threshold, and (b) without generating an online authorization request, save in a clearing database an authorization confirmation message that includes the account number and the authorization amount.

16 Claims, 5 Drawing Sheets

(51) Int. Cl.
    *G06F 16/903*     (2019.01)
    *G06Q 20/02*     (2012.01)

(56) References Cited

U.S. PATENT DOCUMENTS

| | | | |
|---|---|---|---|
| 7,765,162 B2 * | 7/2010 | Binder | G06Q 20/403 705/66 |
| 7,827,101 B2 * | 11/2010 | Mascavage, III | G06Q 20/102 705/39 |
| 8,321,345 B2 * | 11/2012 | Makhotin | G06Q 20/10 705/41 |
| 8,370,258 B2 * | 2/2013 | Roberts | G06Q 20/382 705/44 |
| 8,584,936 B2 * | 11/2013 | Fiebiger | G06Q 20/4016 235/380 |
| 8,645,272 B2 * | 2/2014 | MacMillan | G06Q 20/405 705/41 |
| 8,768,840 B2 * | 7/2014 | Bozeman | G06Q 20/26 705/44 |
| 8,856,045 B1 * | 10/2014 | Patel | G07F 9/001 705/71 |
| 8,954,344 B2 * | 2/2015 | Lishak | G06Q 20/349 705/13 |
| 9,286,604 B2 * | 3/2016 | Aabye | H04L 63/102 |
| 9,336,544 B2 * | 5/2016 | Nakajima | G06Q 20/1235 |
| 9,342,832 B2 * | 5/2016 | Basu | G06Q 20/02 |
| 9,430,765 B2 * | 8/2016 | Wyatt | G06Q 20/409 |
| 9,454,754 B2 * | 9/2016 | Head | G06Q 20/322 |
| 9,454,865 B2 * | 9/2016 | Kranzley | G06Q 20/352 |
| 9,489,674 B2 * | 11/2016 | Faith | G06Q 30/0205 |
| 9,697,510 B2 * | 7/2017 | Smith | G06Q 20/425 |
| 9,741,051 B2 * | 8/2017 | Carpenter | G06Q 20/02 |
| 10,762,481 B2 * | 9/2020 | Haldenby | G06Q 20/10 |
| 10,846,694 B2 * | 11/2020 | Wong | H04L 9/3234 |
| 2003/0191709 A1 * | 10/2003 | Elston | G06Q 30/0225 705/40 |
| 2006/0131385 A1 * | 6/2006 | Kim | G06Q 20/40 235/379 |
| 2006/0131390 A1 * | 6/2006 | Kim | G06Q 20/40 235/380 |
| 2007/0043682 A1 * | 2/2007 | Drapkin | G06Q 20/3829 705/71 |
| 2007/0118472 A1 * | 5/2007 | Allen-Rouman | G06Q 20/02 705/39 |
| 2009/0164325 A1 * | 6/2009 | Bishop | G06Q 20/204 705/17 |
| 2010/0318446 A1 * | 12/2010 | Carter | G06Q 40/12 705/30 |
| 2012/0197802 A1 * | 8/2012 | Smith | G06Q 20/4016 705/44 |
| 2012/0239574 A1 * | 9/2012 | Smith | G06Q 20/4014 705/44 |
| 2013/0091000 A1 * | 4/2013 | Hagey | G06Q 30/02 705/14.23 |
| 2013/0185167 A1 * | 7/2013 | Mestre | G06Q 20/202 705/21 |
| 2014/0206311 A1 * | 7/2014 | Carter | H04M 17/00 455/408 |
| 2014/0304130 A1 | 10/2014 | Winters et al. | |
| 2014/0379580 A1 * | 12/2014 | Varma | G06Q 20/386 705/44 |
| 2015/0012430 A1 * | 1/2015 | Chisholm | G06Q 20/34 705/44 |
| 2015/0073995 A1 * | 3/2015 | Hayhow | G06Q 20/3821 705/71 |
| 2015/0220911 A1 | 8/2015 | Cowen | |
| 2016/0086222 A1 | 3/2016 | Kurapati | |

* cited by examiner

NETWORK AND METHOD FOR CLEARING POINT-OF-SALE TERMINAL PRE-AUTHORIZATIONS

RELATED APPLICATIONS

This patent application is a continuation of U.S. patent application Ser. No. 15/724,249, filed Oct. 3, 2017, the contents of which are incorporated herein by reference.

FIELD

This patent application relates to a network and method for clearing authorizations stored at a point-of-sale terminal.

BACKGROUND

A consumer might elect to use a point-of-sale (POS) terminal and a payment card (e.g. credit card or debit card) to complete a financial transaction with a merchant (e.g. pay for a merchant's wares/services). After the consumer interfaces the payment card with the POS terminal, and the terminal reads the account number from the payment card, the POS terminal may generate an online authorization request (e.g. authorization amount, and account number), and transmit the authorization request to the merchant's financial institution (acquirer) via a secure acquirer network.

The acquirer initiates clearing of the transaction by transmitting the authorization request over a secure payment network to the issuer of the payment card. If the consumer's account with the card issuer has a credit or balance that is sufficient to complete the transaction, the card issuer posts the authorization amount to the consumer's account, generates an authorization response message, and transmits the authorization response message to the acquirer via the secure payment network. The acquirer returns the authorization response message to the POS terminal via the secure acquirer network. The security requirements of the acquirer network and the payment network, together with the data traffic over those networks increases the latency of the online authorization/clearing process.

SUMMARY

This patent application discloses a network and associated method that clears pre-authorized transactions that are initiated at a point-of-sale (POS) terminal.

In accordance with a first aspect of this disclosure, there is provided a POS terminal that includes a card interface and at least one processor. The at least one processor is coupled to the card interface, and is configured to receive a plurality of pre-authorization requests, each including an authorization amount and further including an account number that is received from the card interface.

The at least one processor is configured to (in response to each pre-authorization request) locate in a pre-authorization database a database record that is associated with the respective account number, confirm that the respective authorization amount is not greater than an offline authorization threshold, generate an authorization confirmation message that includes the respective account number and the respective authorization amount, and save the authorization confirmation message in a clearing database.

The at least one processor is also configured to generate a clearing payload that includes the plurality of saved authorization confirmation messages, and to transmit the clearing payload over a computer network.

In accordance with a second aspect of this disclosure, there is provided a method of clearing POS terminal pre-authorizations. The method involves a POS terminal receiving a plurality of pre-authorization requests, each including an authorization amount and further including an account number that is received from a payment card that is interfaced with the POS terminal.

The method also involves the POS terminal (in response to each pre-authorization request) locating in a pre-authorization database a database record that is associated with the respective account number, confirming that the respective authorization amount is not greater than an offline authorization threshold, generating an authorization confirmation message that includes the respective account number and the respective authorization amount, and saving the authorization confirmation message in a clearing database.

The method also involves the POS terminal generating a clearing payload that includes the plurality of saved authorization confirmation messages, and transmitting the clearing payload over a payment network.

In accordance with a third aspect of this disclosure, there is provided a computer-readable medium that stores comprising computer processing instructions for execution by at least one processor of a POS terminal. The POS terminal includes a card interface.

The processing instructions, when executed by the at least one processor, cause the POS terminal to receive a plurality of pre-authorization requests, each comprising an authorization amount and further comprising an account number that the POS terminal receives via the card interface.

The processing instructions also cause the processor (in response to each pre-authorization request) to locate in a pre-authorization database a database record that is associated with the respective account number, confirm that the respective authorization amount is not greater than an offline authorization threshold, generate an authorization confirmation message that includes the respective account number and the respective authorization amount, and save the authorization confirmation message in the clearing database.

The processing instructions also cause the processor to generate a clearing payload that includes the plurality of saved authorization confirmation messages, and transmit the clearing payload over a computer network.

In one implementation, one or more of the database records of the pre-authorization database store one of the offline authorization thresholds in association with one of the account numbers. The processing instructions cause the processor to locate the one offline authorization threshold that is associated with the one account number in the pre-authorization database, and to confirm that the respective authorization amount is not greater than the located offline authorization threshold.

In one implementation, a computer server receives the clearing payload. For each authorization confirmation message that is included in the clearing payload, the computer server locates, in a customer account database, a database record associated with the respective account number, and posts to the located customer account database a database entry that includes the authorization amount.

The POS terminal may receive, from the computer server, a pre-authorization payload that includes at least one pre-authorization data set, and may update the pre-authorization database with the pre-authorization payload. One of the pre-authorization data sets may include one of the account numbers and the associated offline authorization threshold.

Since the POS terminal generates each authorization confirmation message without going online, and transmits multiple saved authorization confirmation messages as a single clearing payload, the latency of the authorization and clearing process may be less than that of the conventional online authorization/clearing process.

BRIEF DESCRIPTION OF THE DRAWINGS

An exemplary payment authorization/clearing network, POS terminal, and method for clearing POS terminal pre-authorizations will now be described, with reference to the accompanying drawings, in which.

DETAILED DESCRIPTION

Payment Clearing Network

Figure 1:
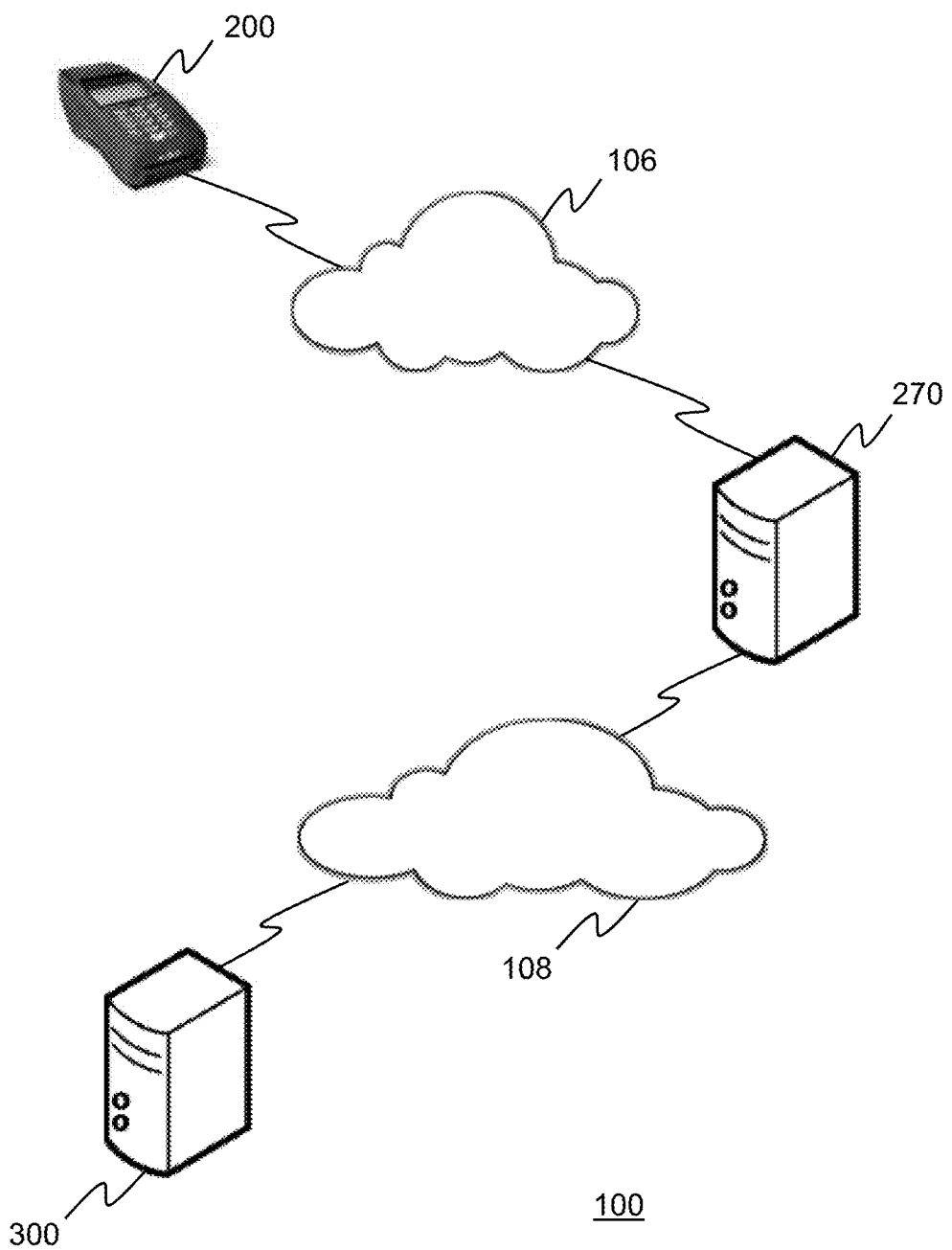
FIG. 1 is a schematic view of a payment authorization/clearing network, depicting a POS terminal, and a payment card issuer server.

FIG. 1 is a schematic view of the payment authorization/clearing network, denoted generally as 100. As shown, the payment authorization/clearing network 100 comprises a point-of-sale (POS) terminal 200, an acquirer server 270 and a payment card issuer server 300, and is configured to process financial transactions initiated by a payment cardholder at one of the POS terminals 200. As used herein, a "financial transaction" includes "online" transactions for which the POS terminal 200 may request authorization from the issuer server 300 in real-time, and "off-line" transactions which the POS terminal 200 may authorize immediately without seeking prior authorization from the issuer server 300.

The POS terminals 200 are typically deployed at a merchant's business premises, and are configured to communicate with one of the acquirer servers 270 via a secure acquirer network 106. Where the merchant deploys a plurality of POS terminals 200, the merchant's POS terminals 200 may be deployed on a local area network that is maintained by the merchant, and may be configured to communicate with the merchant's acquirer server 270 via the merchant's local area network and the secure acquirer network 106.

As non-limiting examples, one or more of the POS terminals 200 may be implemented as a fully-integrated ("dumb") pin-pad terminal that interfaces with an electronic cash register (ECR) and communicates sensitive card data to the acquirer server 270 via the ECR, or as a semi-integrated ("smart") pin-pad terminal that communicates sensitive card data directly to the acquirer server 270 via the merchant's local area network and the acquirer network 106.

Each acquirer server 270 is associated with a respective merchant, and is configured to communicate with the POS terminals 200 that are deployed at each merchant premises via the acquirer network 106 and each merchant's local area network (if any). The acquirer servers 270 are also configured to communicate with the issuer server(s) 300 via a payment network 108, such as VisaNet or the Mastercard Network.

Each issuer server 300 may be associated with and administered by a card issuer (e.g. a financial institution, independent card issuer) that issues payment cards to cardholders (or authorizes a third party to issue the payment cards). Each issuer server 300 is configured to communicate with the acquirer servers 270 via the payment network 108, and may maintain a secure accounts database that includes a plurality of database records each associated with a respective cardholder account. Each database record of the accounts database may identify, for example, a primary account number that is uniquely associated with a cardholder's payment card 212, and a credit/deposit entry to the associated cardholder account.

Each issuer server 300 may also maintain, for each payment card 212 issued by the card issuer, a respective cryptographic master key and also a transaction counter which the issuer server 300 increments in response to each online authorization request received from the associated payment card 212.

Although the payment authorization/clearing network 100 is shown comprising only a single POS terminal 200, a single acquirer server 270 and a single issuer server 300, the payment authorization/clearing network 100 typically includes a plurality of the POS terminals 200, a plurality of the acquirer servers 270, and a plurality of the issuer servers 300.

Payment Card

As will be discussed in greater detail below, the POS terminal 200 may include a payment card interface 210 that allows the POS terminal 200 to communicate with a payment card 212.

The payment card 212 may have a contact form factor and/or a contactless (e.g. ISO 14443 based) form factor, and may be implemented as a plastic smartcard, chip card or integrated circuit card that includes a built-in micro-controller and a protected memory. The micro-controller and protected memory may together provide a secure self-contained computing environment for running cryptographic (e.g. data encryption standard (DES), triple-DES, advanced encryption standard (AES)) algorithms. Alternately, the payment card 212 may be implemented in software executing on a portable communications device, such as a smart phone.

Where the payment card 212 is implemented as a plastic card, preferably the payment card 212 is configured to facilitate online authorization of financial transactions using the Europay Mastercard Visa (EMV) payment card standard. Alternately, where the payment card 212 is implemented in software executing on a portable communications device, preferably the payment card 212 is configured to implement the payment card requirements of the EMV standard and to facilitate online authorization of financial transactions using the EMV standard.

The payment card 212 stores a primary account number that is uniquely associated with the payment card 212 by the card issuer, and may also store a respective cryptographic master key. The payment card 212 may also maintain a transaction counter which the payment card 212 increments for each online authorization request generated by the payment card 212.

Where the payment card 212 is implemented as a plastic payment card, the primary account number and the cryptographic master key may be stored in the protected memory of the payment card 212 prior to delivery of the payment card 212 to the intended user. Where the payment card 212 is implemented in software executing on a portable communications device, the payment card 212 may be configured with the account number and the cryptographic master key when the payment card 212 is installed on the portable communications device.

POS Terminal

Figure 2:
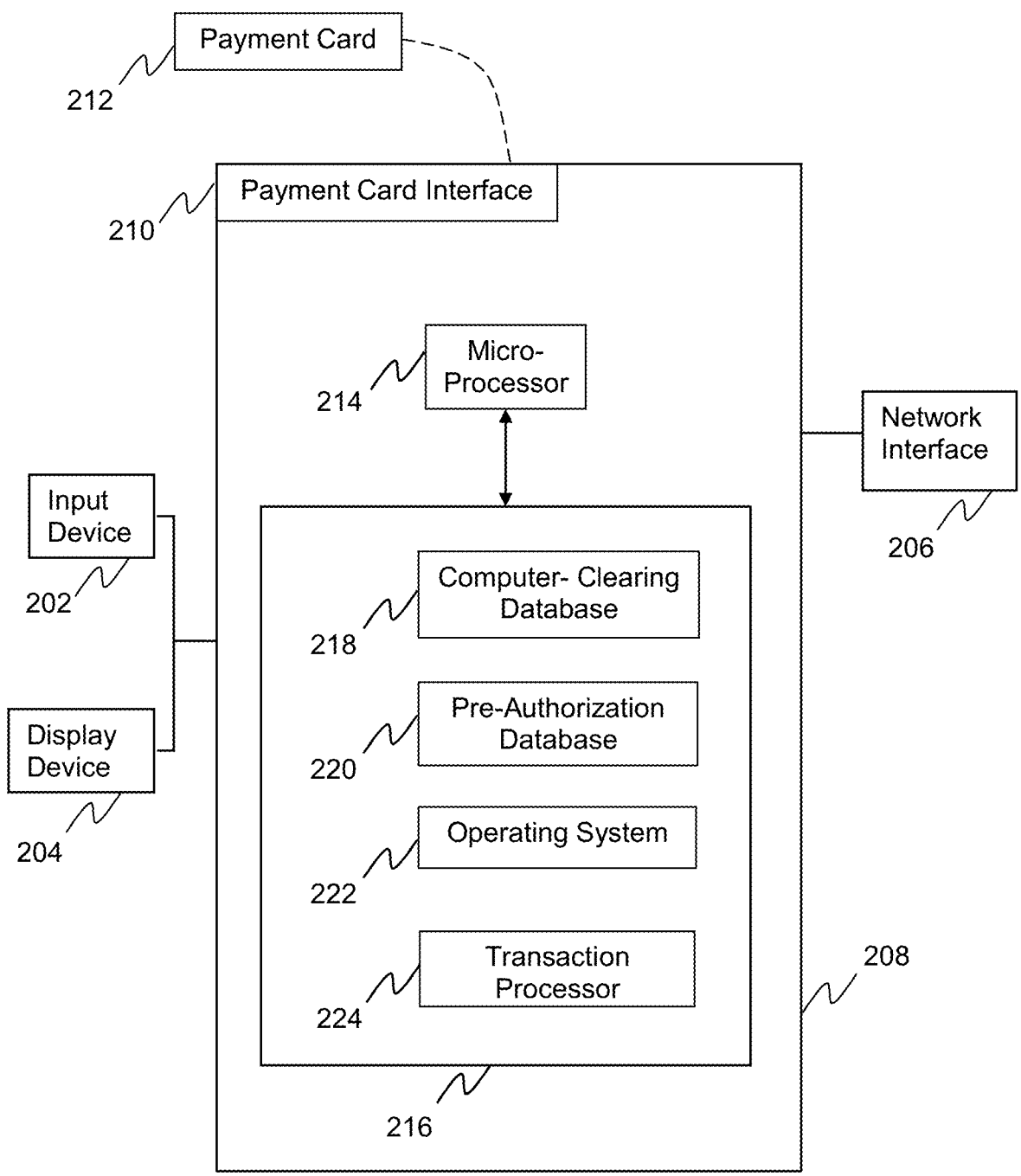
FIG. 2 is a schematic view of a sample POS terminal.

In the example shown in FIG. 2, the POS terminal 200 includes an input device 202, a display device 204, a network interface 206, and a data processing system 208 that is coupled to the input device 202, the display device 204 and the network interface 206.

The input device 202 may be implemented as a keyboard, touchpad, touchscreen or other input device suitable for allowing a user of the POS terminal 200 to input data and/or commands that may be required to complete the financial transaction. The display device 204 may be implemented as a liquid crystal display (LCD) panel, cathode ray tube (CRT) display, plasma display panel, or other display device suitable for displaying transaction information to the user. Depending upon the configuration (e.g. fully-integrated, semi-integrated) of the POS terminal 200, the network interface 206 allows the data processing system 208 to communicate with an associated ECR and/or with the merchant's local area network.

The POS terminal 200 also includes a payment card interface 210 that allows the data processing system 208 to communicate with a payment card 212 that may be interfaced with the payment card interface 210. The payment card interface 210 may comprise a physical port (e.g. smartcard reader) that allows the data processing system 208 to communicate directly with payment cards 212 that have a contact form factor. Alternately (or additionally), the payment card interface 210 may comprise a wireless interface that allows the data processing system 208 to communicate, using a wireless protocol, such as ISO 14443, with payment cards 212 that have a contactless form factor The payment card interface 210 may also be configured to communicate, using short-range communications protocols, such as Bluetooth and/or Near Field Communications (NFC), with payment cards that are implemented in a portable communications device.

The data processing system 208 may include one or more microprocessors 214, and one or more non-transient computer-readable media 216. As a non-limiting example, the computer-readable media 216 may be provided as non-volatile electronic computer (e.g. FLASH) memories.

One or more of the computer-readable media 216 may store a clearing database 218 of financial transactions which the POS terminal 200 has authorized offline. Alternately, the clearing database 218 may be stored on the ECR (if any) that is associated with the POS terminal 200. The clearing database 218 may include, for each financial transaction, the payment amount ("authorization amount") that the merchant required from the customer to complete the financial transaction with the merchant, and the primary account number of the payment card 212 that the customer used in the financial transaction.

One or more of the computer-readable media 216 may store a pre-authorization database 220 of payment cards for which the card issuer has pre-authorized the POS terminal 200 to authorize a financial transaction offline (i.e. without communicating with the issuer server 300). Alternately, the pre-authorization database 220 may be stored (i) on the ECR (if any) that is associated with the POS terminal 200, or (ii) locally on a server (not shown) that serves the POS terminals 200 on the merchant's local area network.

The pre-authorization database 220 includes a plurality of database records each associated with a respective payment card 212. In one implementation of the pre-authorization database 220, each database record stores the primary account number of the associated payment card 212, and also stores a respective offline authorization threshold that is associated with the primary account number.

In another implementation of the pre-authorization database 220, each database record stores the primary account number of the associated payment card 212 but without an associated offline authorization threshold. Further, the computer-readable media 216 may store a default offline authorization threshold. Alternately, the default authorization threshold may be stored (i) on the ECR (if any) that is associated with the POS terminal 200, or (ii) locally on a server (not shown) that serves the POS terminals 200 on the merchant's local area network.

In another implementation of the pre-authorization database 220, one or more of the database records store the primary account number of the associated payment card 212 and an associated offline authorization threshold, and the remainder of the database records store the primary account number of the associated payment card 212 but without any associated offline authorization threshold. Further, the computer-readable media 216 stores a default offline authorization threshold. Alternately, the default authorization threshold may be stored (i) on the ECR (if any) that is associated with the POS terminal 200, or (ii) locally on a server (not shown) that serves the POS terminals 200 on the merchant's local area network.

The computer-readable media 216 may also store computer processing instructions which, when accessed and executed by the microprocessor(s) 214, implement an operating system 222 and a transaction processor 224. Alternately, all or a portion of the functionality of the transaction processor 224 may be implemented instead in electronics hardware, such as a field programmable logic gate array (FPGA) or a complex programmable logic device (CPLD).

The operating system 222 allows the POS terminal 200 to accept user input from the input device 202 and to control the display device 204 and the payment card interface 210.

The functionality configured into the transaction processor 224 will be discussed in greater detail below. By way of overview, the transaction processor 224 is configured to receive pre-authorization requests, each comprising a primary account number and further comprising the payment amount ("authorization amount") that the merchant may require from the customer to complete a financial transaction with the merchant. As will be explained, the transaction processor 224 receives the primary account number from a payment card 212 that may be interfaced with the payment card interface 210. The transaction processor 224 may receive the authorization amount via the data input device 202, or from the associated ECR (if any) via the network interface 206.

The transaction processor 224 is also configured to (in response to each pre-authorization request) i) locate in the pre-authorization database 220 a database record that is associated with the primary account number, ii) confirm that the authorization amount is not greater than an offline authorization threshold, iii) generate an authorization confirmation message that includes the primary account number and the authorization amount, and iv) save the authorization confirmation message in the clearing database 218.

The transaction processor 224 is also configured to generate a Clearing Payload that includes the saved authorization confirmation messages, and to transmit the Clearing Payload over the payment network 108 (e.g. via the acquirer network 106, and the acquirer server 270). The transaction processor 224 may also be configured to purge the saved authorization confirmation messages from the clearing database 218.

The transaction processor 224 may be configured to transmit the Clearing Payloads (and optionally purge the saved authorization confirmation messages) when the number of stored authorization confirmation messages reaches a predetermined maximum number of massages. Alternately, or additionally, the transaction processor 224 may be configured to transmit the Clearing Payloads (and optionally purge the saved authorization confirmation messages) periodically (e.g. once at the end of each business day), and/or earlier when the capacity in the clearing database 218 for additional authorization confirmation messages reaches or approaches a maximum capacity.

As discussed above, one or more of the database records of the pre-authorization database 220 may store a primary account number and an associated offline authorization threshold. In this implementation, the transaction processor 224 may be configured to locate the offline authorization threshold that is associated with the primary account number in the pre-authorization database 220, and to confirm that the respective authorization amount is not greater than the located offline authorization threshold.

It should be understood, however, that the process(es) implemented by the POS terminal 200 for offline (and online) authorization/settlement of financial transactions may differ from that described in the foregoing overview, depending upon various configuration parameters, including the configuration of the pre-authorization database 220, the magnitude of the authorization amount for the financial transaction, and the configuration of the transaction processor 224.

For example, if each database record of the pre-authorization database 220 stores a primary account number and an associated offline authorization threshold, the transaction processor 224 may be configured to authorize the financial transaction offline where the primary account number of the customer's payment card 212 matches one of the primary account numbers stored in the pre-authorization database 220, and the authorization amount does not exceed the respective offline authorization threshold that is associated with the primary account number of the customer's payment card 212 in the pre-authorization database 220.

In this implementation, the transaction processor 224 may be configured to initiate online authorization of the financial transaction with the issuer server 300 where the primary account number of the customer's payment card 212 does not match any of the primary account numbers stored in the pre-authorization database 220. The transaction processor 224 may also be configured to initiate online authorization of the financial transaction with the issuer server 300 where the primary account number of the customer's payment card 212 matches one of the primary account numbers stored in the pre-authorization database 220, but the authorization amount exceeds the offline authorization threshold that is associated with the primary account number of the customer's payment card 212 in the pre-authorization database 220.

Alternately, if each database record of the pre-authorization database 220 stores a primary account number of the associated payment card 212 but without an associated offline authorization threshold, the transaction processor 224 may be configured to authorize the financial transaction offline where the primary account number of the customer's payment card 212 matches one of the primary account numbers stored in the pre-authorization database 220, and the authorization amount for the financial transaction does not exceed the default offline authorization threshold.

In this implementation, the transaction processor 224 may be configured to initiate online authorization of the financial transaction with the issuer server 300 where the primary account number of the customer's payment card 212 does not match any of the primary account numbers stored in the pre-authorization database 220. The transaction processor 224 may also be configured to initiate online authorization of the financial transaction with the issuer server 300 where the primary account number of the customer's payment card 212 matches one of the primary account numbers stored in the pre-authorization database 220, but the authorization amount exceeds the default offline authorization threshold.

If one or more of the database records of the pre-authorization database 220 store a primary account number and an associated offline authorization threshold, and the remainder of the database records of the pre-authorization database 220 store a primary account number but without any associated offline authorization threshold, the transaction processor 224 may be configured to authorize the financial transaction offline where the primary account number of the customer's payment card 212 matches one of the primary account numbers stored in the pre-authorization database 220, the associated database record stores a respective offline authorization threshold, and the authorization amount does not exceed the offline authorization threshold. The transaction processor 224 may also be configured to authorize the financial transaction offline where the database record associated with the primary account number of the customer's payment card 212 does not store an offline authorization threshold, but the authorization amount does not exceed the default offline authorization threshold.

In this implementation, the transaction processor 224 may be configured to initiate online authorization of the financial transaction with the issuer server 300 where the primary account number of the customer's payment card 212 does not match any of the primary account numbers stored in the pre-authorization database 220. The transaction processor 224 may also be configured to initiate online authorization of the financial transaction with the issuer server 300 where the primary account number of the customer's payment card 212 matches one of the primary account numbers stored in the pre-authorization database 220, but the authorization amount exceeds the offline authorization threshold that is associated with the primary account number of the customer's payment card 212 in the pre-authorization database 220.

In this implementation, the transaction processor 224 may also be configured to initiate online authorization of the financial transaction with the issuer server 300 where the primary account number of the customer's payment card 212 matches one of the primary account numbers stored in the pre-authorization database 220, the database record associated with the primary account number of the customer's payment card 212 does not store a respective offline authorization threshold, but the authorization amount exceeds the default offline authorization threshold.

Method of Clearing Authorized Transactions

As discussed, the payment authorization/clearing network 100 implements a method of clearing authorized transactions. A sample embodiment of the transaction authorization/clearing method will be discussed with reference to FIGS. 3*a*, 3*b* and 4. As will be explained, in this embodiment the POS terminal 200 receives a plurality of pre-authorization requests, each comprising a primary account number and further comprising the authorization amount that the merchant may require from the customer to complete a financial transaction with the merchant. The POS terminal 200 receives the primary account number from a payment card 212, and may receive the authorization amount from the data input device 202 or from the network interface 206.

In response to each pre-authorization request, the POS terminal 200 i) locates in the pre-authorization database 220 a database record that is associated with the primary account number, ii) confirms that the authorization amount is not greater than an offline authorization threshold, iii) generates an authorization confirmation message that includes the primary account number and the authorization amount, and iv) saves the authorization confirmation message in the clearing database 218.

Thereafter, the POS terminal 200 generates a Clearing Payload that includes the saved authorization confirmation messages, and transmits the Clearing Payload over the payment network 108.

Figure 3A:
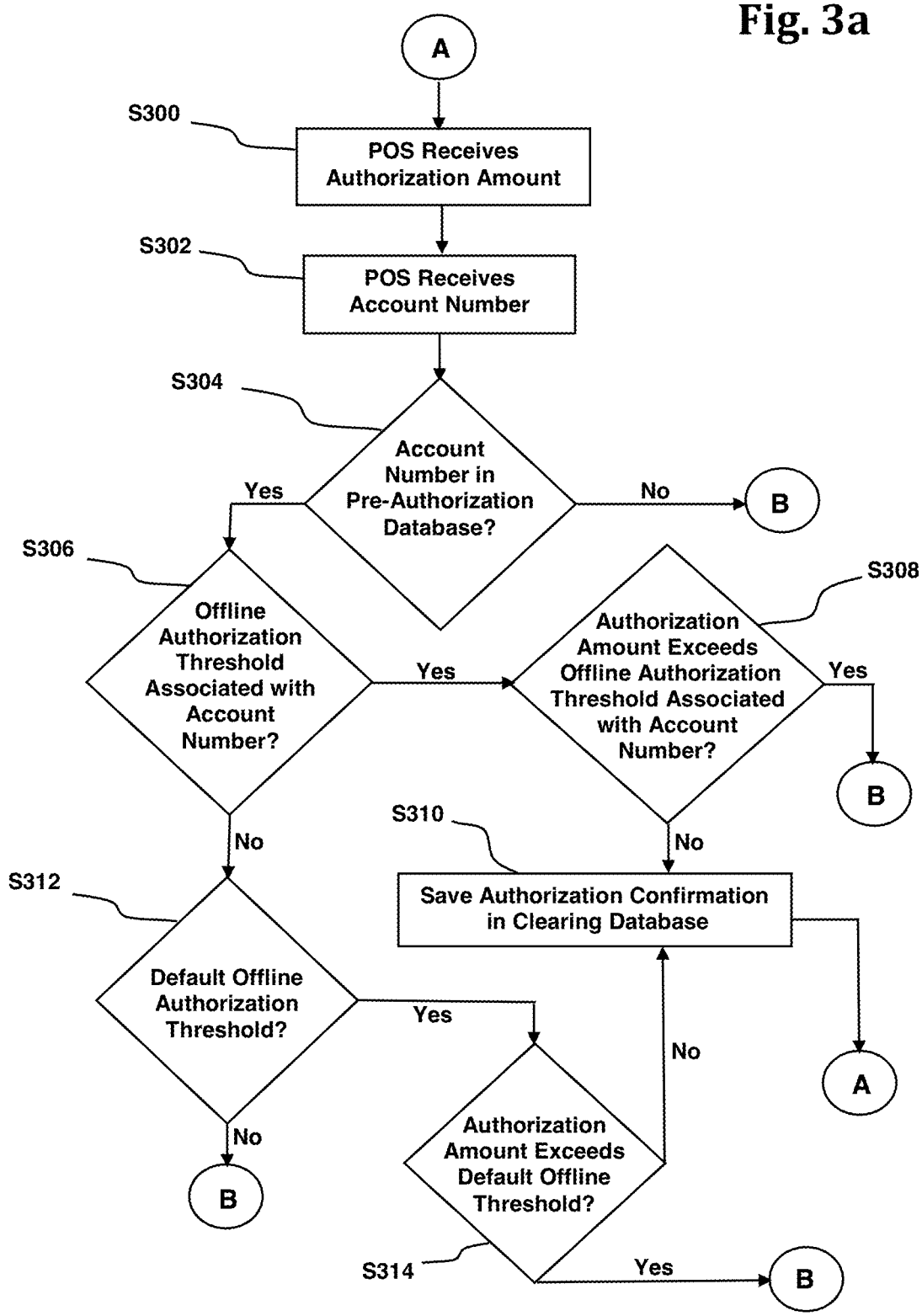
FIGS. 3a and 3b together comprise a flow chart depicting a sample method for processing authorization requests online and offline.
Figure 3B:
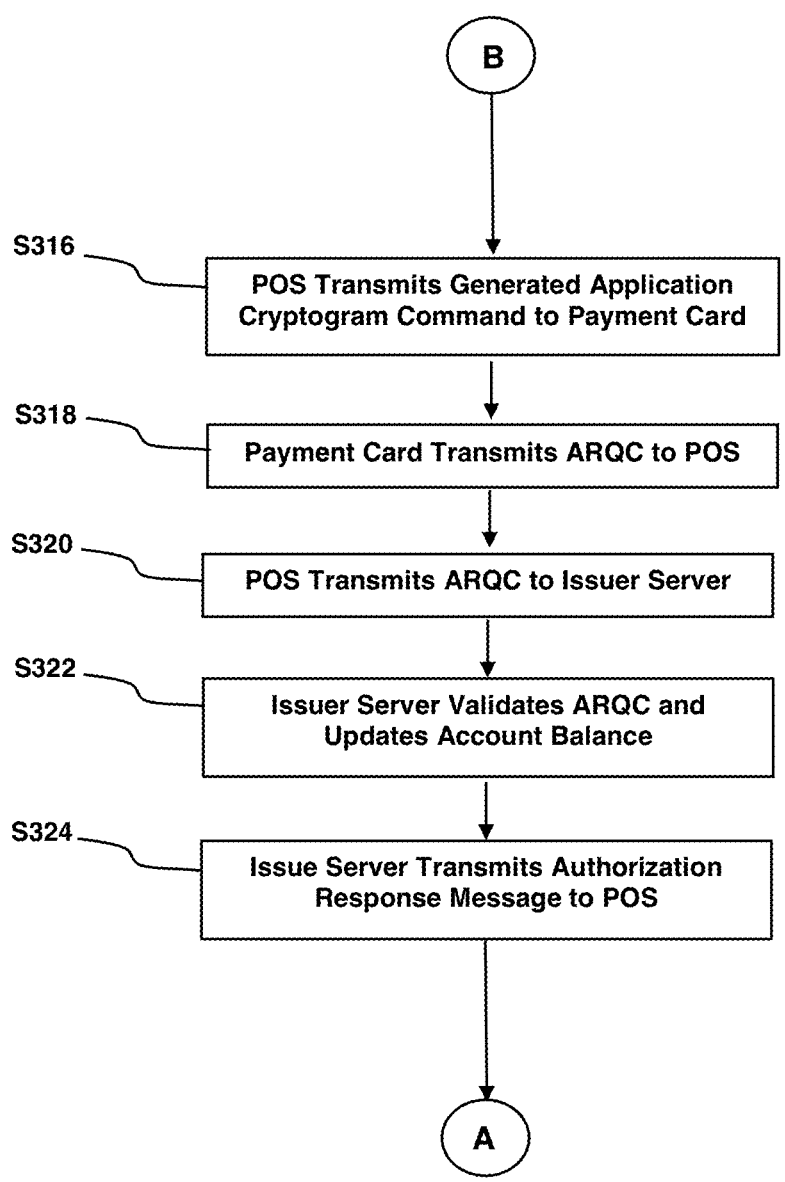

An example method of processing authorization requests will now be discussed in detail with reference to FIGS. 3a and 3b.

A customer attends at a merchant's POS terminal 200 to complete a financial transaction (e.g. pay for wares and/or services) with the merchant. At step S300, the POS terminal 200 receives the authorization amount from the data input device 202, or from the associated ECR (if any) via the network interface 206.

The POS terminal 200 displays the authorization amount on the display device 204, and prompts the customer to approve the displayed authorization amount via the input device 202. The POS terminal 200 also prompts the customer to interface a payment card 212 with the payment card interface 210 of the POS terminal 200.

After the customer (cardholder) interfaces a payment card 212 with the payment card interface 210 and approves the displayed authorization amount, the transaction processor 224 of the POS terminal 200 transmits to the payment card 212 a Read Record command requesting various data elements from the payment card 212. Typically, the Read Record command requests at least the primary account number, and the expiry date of the payment card 212.

The payment card 212 responds to the payment terminal 200, at step S302, with the primary account number and any other data requested by the Read Record command. In this example, the authorization amount, primary account number and the other data requested by the Read Record command (if any) constitute the aforementioned pre-authorization request.

As discussed, the POS terminal 200 may be configured with a pre-authorization database 220 (or may be in communication with a pre-authorization database 220 that is maintained on an ECR, or on a server that serves the POS terminals 200 on the merchant's local area network) of payment cards for which the card issuer has pre-authorized the POS terminal 200 to authorize a financial transaction offline.

Accordingly, at step S304, the transaction processor 224 queries the pre-authorization database 220 (whether stored internally or externally to the POS terminal 200) with the primary account number received from the payment card 212 for a database record associated with the primary account number (i.e. a database record has an account field matching the received primary account number).

If the query, at step S304, does not locate a database record that is associated with the primary account number in the pre-authorization database 220, the card issuer has not pre-authorized the specified primary account number for offline authorization of any financial transactions. Accordingly, in that case, at step S320 the transaction processor 224 initiates online authorization and clearing of the financial transaction.

Conversely, if the query, at step S304, locates a database record that is associated with the primary account number in the pre-authorization database 220, the card issuer has pre-authorized the specified primary account number for offline authorization of financial transactions. Accordingly, in this case, the transaction processor 224 initiates offline authorization of the financial transaction by confirming that the authorization amount does not exceed any applicable offline authorization threshold.

In order to confirm that the authorization amount does not exceed any applicable offline authorization threshold, at step S306 the transaction processor 224 may scan the located database record to determine whether the database record includes an offline authorization threshold that is associated with the primary account number (i.e. the record has an offline authorization field that is populated with data). If the located database record does not include an offline authorization threshold, at step S312 the transaction processor 224 may then determine whether the authorization amount does not exceed a default offline authorization threshold.

If the located database record includes an offline authorization threshold, at step S308 the transaction processor 224 may determine whether the authorization amount exceeds the offline authorization threshold specified in the database record. If the authorization amount exceeds the specified offline authorization, at step S320 the transaction processor 224 initiates online authorization and clearing of the financial transaction.

However, if the authorization amount does not exceed the specified offline authorization threshold, at step S310 the transaction processor 224 generates an authorization confirmation message confirming that the financial transaction was successfully authorized offline, and saves the authorization confirmation message in the clearing database 218. The saved authorization confirmation message may include the primary account number and the authorization amount.

If the located database record does not include an offline authorization threshold, at step S312 the transaction processor 224 may search the computer-readable media 216 and/or the merchant's local area network for a default offline authorization threshold.

If the search, at step S312, does not locate a default offline authorization threshold, at step S320 the transaction processor 224 initiates online authorization and clearing of the financial transaction.

Conversely, if the search, at step S312, locates a default offline authorization threshold, at step S314 the transaction processor 224 may determine whether the authorization amount exceeds the default offline authorization threshold. If the authorization amount exceeds the default offline authorization threshold, at step S320 the transaction processor 224 initiates online authorization and clearing of the financial transaction.

However, if the authorization amount does not exceed the default offline authorization threshold, at step S310 the transaction processor 224 generates an authorization confirmation message confirming that the financial transaction was successfully authorized offline, and saves the authorization confirmation message in the clearing database 218. As noted above, the saved authorization confirmation message may include the primary account number and the authorization amount.

If the pre-authorization database 220 does not store a database record that is associated with the primary account number of the customer's payment card 212, or the pre-authorization database 220 stores such a database record but the authorization amount exceeds (i) the offline authorization threshold associated with the primary account number (if applicable) or (ii) the default offline authorization threshold (if applicable), at step S316 the transaction processor 224 initiates online authorization of the financial transaction by transmitting to the payment card 212 a Generate Application Cryptogram command that requests an online cryptogram from the payment card 212. The Generate Application Cryptogram command includes at least the authorization amount.

Upon receipt of the Generate Application Cryptogram command, the payment card 212 may generate an online Application Request Cryptogram (ARQC) by (i) generating a session key by applying the payment card's cryptographic master key and the transaction counter as inputs to a cryptographic algorithm, and (ii) applying the session key, the primary account number, and the authorization amount as inputs to the cryptographic algorithm. The payment card 212 may transmit the online cryptogram ARQC to the POS terminal 200, at step S318.

The transaction processor 224 may generate an Authorization Request message that includes the primary account number, the authorization amount, and the online cryptogram ARQC, and forward the Authorization Request message to the acquirer server 270 via the merchant's local area network and the acquirer network 106. At step S320, the acquirer server 270 may direct the Authorization Request message to the issuer server 300, over the payment network 108, for validation.

At step S322, the issuer server 300 may verify that the payment card 212 generated the online cryptogram ARQC from the authorization amount. To do so, the issuer server 300 may (i) recover the payment card's session key by applying the payment card's cryptographic master key and transaction counter as inputs to the cryptographic algorithm, (ii) decrypt the online cryptogram ARQC with the recovered session key, (iii) compute a message authentication code from the primary account number and the authorization amount, and (iv) compare the computed message authentication code against the decrypted cryptogram.

At step S322, the issuer server 300 also determines whether the cardholder account that is associated with the primary account number in the card issuer's secure accounts database has sufficient credit/funds to complete the transaction (i.e. the authorization amount does not exceed the credit/funds balance for the account).

If the issuer server 300 determines that the payment card 212 generated the online cryptogram ARQC from the authorization amount, and the cardholder account has sufficient credit/funds to complete the transaction, at step S324 the issuer server 300 may generate an authorization code that indicates that the financial transaction was authorized, generate an Authorization Response message that includes the authorization code, and may transmit the Authorization Response message to the acquirer server 270 over the payment network 108. The acquirer server 270 may forward the Authorization Response message to the POS terminal 200 via the merchant's local area network and the acquirer network 106.

The transaction processor 224 repeats steps S300 to S324 for each pre-authorization request received at the POS terminal 200.

Figure 4:
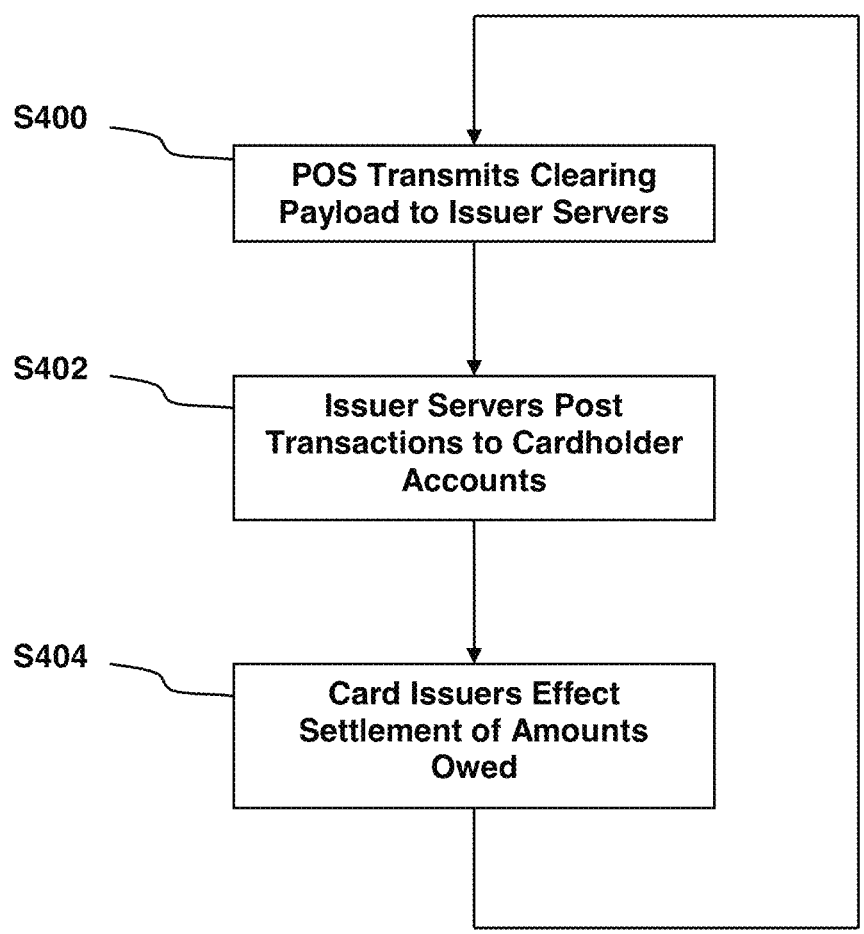
FIG. 4 is a flow chart depicting a sample method for clearing transactions.

An example clearing method will now be discussed in detail with reference to FIG. 4.

As pre-authorization requests for financial transactions become authorized offline, the clearing database 218 will become populated with authorization confirmation messages. However, until the particulars of those transactions are cleared with the respective issuer servers 300, merchants will not receive payment for any pre-authorized financial transactions that were authorized offline.

Therefore, to initiate clearing of these pre-authorized transactions, at step S400 the transaction processor 224 generates a Clearing Payload that includes all (or a smaller portion) of the authorization confirmation messages that are saved in the clearing database 218, and transmits the Clearing Payload to the merchant's acquirer server 270 via the merchant's local area network and the acquirer network 106.

At step S400, the transaction processor 224 may also purge these authorization confirmation messages from the clearing database 218. Alternately, the transaction processor 224 may track the time/date of each authorization confirmation message and the time/date of the previous Clearing Payload transmission, and may incorporate into the Clearing Payload only the authorization confirmation messages that were saved in the clearing database 218 subsequent to the last Clearing Payload transmission.

The acquirer server 270 may then bundle together the authorization confirmation messages that are received from all of the acquirer's POS terminals 200, and transmit the authorization confirmation messages to the respective card issuer servers 300 via the payment network 108.

As discussed, the transaction processor 224 may transmit the Clearing Payloads (and optionally purge the saved authorization confirmation messages) when the number of stored authorization confirmation messages reaches a predetermined maximum number of massages. Alternately, or additionally, the transaction processor 224 may transmit the Clearing Payloads (and optionally purge the saved authorization confirmation messages) periodically (e.g. once at the end of each business day), and/or earlier when the capacity in the clearing database 218 for additional authorization confirmation messages reaches or approaches a maximum capacity.

At step S402, each card issuer server 300 may complete clearing of its respective transactions by posting the authorization amounts to the respective cardholder accounts in the secure accounts database. At step S404, each card issuer server 300 may then effect settlement of any amounts owed to the respective acquirers, in the conventional manner.

Merchants will also not receive payment for any of the financial transactions that were authorized online until after the particulars of those transactions are cleared with the respective issuer servers 300. Therefore, to initiate clearing of these latter transactions, at step S402, the issuer server 300 may clear each financial transaction that was authorized online by posting the respective authorization amounts to the respective cardholder accounts. At step S404, the issuer server 300 may then effect settlement of any amounts owed to the respective acquirers, in the conventional manner.

As discussed above, each POS terminal 200 may store (or be in communication with) a pre-authorization database 220 of payment cards. However, as the value of the offline authorization thresholds associated with the respective primary account numbers (if any) in the pre-authorization database 220) can be used to establish whether a particular financial transaction can be authorized offline, the issuer servers 300 may periodically update the pre-authorization databases 220 based on the current credit risk of the card issuers' respective cardholders.

The issuer servers 300 may determine the credit risk of the card issuers' respective cardholders based, for example, on the Clearing Payloads and/or the Authorization Request messages received from the POS terminals 200.

The issuer servers 300 may update the pre-authorization databases 220 by, for example, (i) generating one or more pre-authorization data sets, each including a primary account number and optionally an associated offline authorization threshold, (ii) incorporating the pre-authorization data sets into a pre-authorization payload, and (iii) transmitting the pre-authorization payload to the POS terminals 200. The POS terminals 200 may then update their respective pre-authorization databases 220 with the pre-authorization payloads.

Alternately, where a merchant's deployment includes a local server that serves POS terminals 200 on the merchant's local area network, the issuer servers 300 may transmit the pre-authorization payloads to one or more merchant local servers, and the local servers may update their respective pre-authorization databases 220 with the pre-authorization payloads.

In one embodiment, the issuer server 300 determines from the Clearing Payloads that a particular cardholder is presenting an unacceptable credit risk. For example, the issuer server 300 may determine that the frequency of occurrence of authorization confirmation messages involving a particular account number (i.e. the number of authorization confirmation messages confirming that a particular payment card 212 was used for authorizing financial transactions offline within a particular time frame) exceeds a predetermined maximum limit.

In response, the issuer server 300 may reduce the offline authorization threshold that is associated with the primary account number of the payment card 212 by (i) generating an updated offline authorization threshold that is less than the offline authorization threshold that is associated with the primary account number in the pre-authorization database 220, and (ii) generating a pre-authorization data set that includes the primary account number and the updated offline authorization threshold.

The issuer server 300 may then incorporate the pre-authorization payload into an Authorization Response message, and transmit the Authorization Response message to one of the POS terminals 200, via the acquirer network 106 and the payment network 108, in response to an Authorization Request message received from the POS terminal 200. Upon receipt of the pre-authorization payload, the POS terminal 200 may replace the database entries in its pre-authorization database 220 with the corresponding pre-authorization data sets. Alternately, where the POS terminals 200 are served by a local server on the merchant's local area network, the issuer server 300 may push the pre-authorization payload to the local server, and the local server may replace the database entries in the pre-authorization database 220 with the corresponding pre-authorization data sets.

If the default offline authorization threshold is less than the offline authorization threshold, and the card issuer determines that the default offline authorization threshold would likely reduce the cardholder's credit risk to an acceptable level, the issuer server 300 may instead generate a pre-authorization data set that includes the primary account number but does not include any associated offline authorization threshold.

As discussed above, the issuer server 300 may transmit the pre-authorization payload to one of the POS terminals 200 as part of an Authorization Response message, or may push the pre-authorization payload to a local server on the merchant's local area network. Upon receipt of the pre-authorization payload, the POS terminal 200 (or local server, as applicable) may replace the database entries in in the pre-authorization database 220 with the corresponding pre-authorization data sets.

Conversely, if the card issuer determines that the default offline authorization threshold would not reduce the cardholder's credit risk to an acceptable level, the issuer server 300 may generate a plurality of pre-authorization data sets for each payment card 212 that presents an acceptable credit risk, and exclude from those pre-authorization data sets any data set that includes the primary account number associated with the cardholders payment card 212.

The issuer server 300 may transmit the pre-authorization payload to one of the POS terminals 200 as part of an Authorization Response message, or may push the pre-authorization payload to a local server on the merchant's local area network. Upon receipt of the pre-authorization payload, the POS terminal 200 (or local server, as applicable) may replace the pre-authorization database 220 with the pre-authorization data sets.

In another embodiment, the issuer server 300 determines from the Authorization Request messages that a particular cardholder is presenting an acceptable credit risk. For example, the issuer server 300 may determine that the frequency of occurrence of Authorization Request messages involving a particular account number (i.e. the number of authorization requests for online authorization of financial transactions using a particular payment card 212 within a particular time frame) exceeds a predetermined minimum threshold.

In response, the issuer server 300 may increase the offline authorization threshold that is associated with the primary account number of the payment card 212 by (i) generating an updated offline authorization threshold that is greater than the offline authorization threshold that is associated with the primary account number in the pre-authorization database 220, and (ii) generating a pre-authorization data set that includes the primary account number and the updated offline authorization threshold.

The issuer server 300 may transmit the pre-authorization payload to one of the POS terminals 200 as part of an Authorization Response message, or may push the pre-authorization payload to a local server on the merchant's local area network. Upon receipt of the pre-authorization payload, the POS terminal 200 (or local server, as applicable) may replace the database entries in the pre-authorization database 220 with the corresponding pre-authorization data sets.

The invention claimed is:

1. A clearing network comprising:
   a computer server;
   a point-of-sale terminal; and
   a computer network interconnecting the computer server and the point-of-sale terminal,
   wherein the computer server is configured to:
      receive a plurality of account numbers over the computer network,
      determine that an occurrence of one of the account numbers in the plurality of account numbers exceeds a predetermined maximum limit, and
      via the computer network, update a pre-authorization database with the one account number; and
   wherein the point-of-sale terminal is configured to:
      receive a pre-authorization request comprising an authorization amount and the one account number; and query the pre-authorization database with the one account number, and after locating the one account number in the pre-authorization database from the query:
  (a) confirm that the authorization amount is not greater than an authorization threshold, and
  (b) without generating an online authorization request, save in a clearing database an authorization confirmation message comprising the account number and the authorization amount.

2. The clearing network according to claim 1, wherein:
the pre-authorization database includes the one account number stored in association with an offline authorization threshold; and
the point-of-sale terminal is configured to:
  (a) locate the one account number by retrieving the offline authorization threshold associated with the one account number in the pre-authorization database; and
  (b) confirm the authorization amount by determining that the authorization amount is not greater than the located offline authorization threshold.

3. The clearing network according to claim 1, wherein:
the pre-authorization database includes the one account number stored in association with an offline authorization threshold;
the computer server is configured to update the pre-authorization database by removing the offline authorization threshold associated with the one account number in the pre-authorization database; and
the point-of-sale terminal is configured to confirm the authorization amount by determining that the authorization amount is not greater than the default authorization threshold.

4. The clearing network according to claim 3, wherein the computer server is further configured to update the pre-authorization database by, prior to the removing the offline authorization threshold, determining that the default authorization threshold is less than the offline authorization threshold.

5. The clearing network according to claim 1, wherein:
the computer server is configured to update the pre-authorization database by removing the one account number and the associated offline authorization threshold from the pre-authorization database; and
the point-of-sale terminal is further configured to, after not locating the one account number in the pre-authorization database from the query:
  (a) generate an online authorization request, the online authorization request including the account number and the authorization amount; and
  (b) transmit the online authorization request to the computer server over the computer network.

6. The clearing network according to claim 1, wherein:
the pre-authorization database includes the one account number stored in association with an offline authorization threshold;
the computer server is configured to:
  (a) receive the plurality of account numbers by receiving the authorization confirmation messages over the computer network; and
  (b) update the pre-authorization database by (i) generating an updated authorization threshold less than the offline authorization threshold, and (ii) associating the updated authorization threshold with the one account number in the pre-authorization database in replacement of the offline authorization threshold; and
the point-of-sale terminal is configured to confirm the authorization amount by determining that the authorization amount is not greater than the updated authorization threshold.

7. The clearing network according to claim 1, wherein:
the pre-authorization database includes the one account number stored in association with an offline authorization threshold;
the computer server is configured to:
  (a) receive the plurality of account numbers by receiving online authorization requests over the computer network, the online authorization requests including the account numbers; and
  (b) update the pre-authorization database by (i) generating an updated authorization threshold greater than the offline authorization threshold, and (ii) associating the updated authorization threshold with the one account number in the pre-authorization database in replacement of the offline authorization threshold; and
the point-of-sale terminal is configured to confirm the authorization amount by determining that the authorization amount is not greater than the updated authorization threshold.

8. The clearing network according to claim 7, wherein the computer server is further configured to update the pre-authorization database by incorporating the one account number and the updated authorization threshold into an authorization response message, and transmitting the authorization response message over the computer network in response to one of the online authorization requests.

9. A method of clearing point-of-sale terminal pre-authorizations, the method comprising:
a computer server receiving a plurality of account numbers over a computer network;
the computer server determining that an occurrence of one of the account numbers in the plurality of account numbers exceeds a predetermined maximum limit, and via the computer network updating a pre-authorization database with the one account number;
a point-of-sale terminal receiving a pre-authorization request comprising an authorization amount and the one account number; and
the point-of-sale terminal locating the one account number in the pre-authorization database, confirming that the authorization amount is not greater than an authorization threshold and, without generating an online authorization request, saving in a clearing database an authorization confirmation message comprising the account number and the authorization amount.

10. The method according to claim 9, wherein:
the pre-authorization database includes the one account number stored in association with an offline authorization threshold;
the locating comprises the point-of-sale terminal locating the offline authorization threshold associated with the one account number in the pre-authorization database; and
the confirming comprises the point-of-sale terminal confirming that the authorization amount is not greater than the located offline authorization threshold.

11. The method according to claim 9, wherein:
the pre-authorization database includes the one account number stored in association with an offline authorization threshold;
the updating comprises the computer server removing the offline authorization threshold associated with the one account number in the pre-authorization database; and
the confirming comprises the point-of-sale terminal confirming that the authorization amount is not greater than a default authorization threshold.

12. The method according to claim 11, wherein the updating further comprises, prior to the removing the offline authorization threshold, the computer server determining that the default authorization threshold is less than the offline authorization threshold.

13. The method according to claim 9, wherein the updating comprises the computer server removing the one account number and the associated offline authorization threshold from the pre-authorization database, and the method further comprises:
the point-of-sale terminal not locating the one account number in the pre-authorization database;
the point-of-sale terminal generating an online authorization request, the online authorization request including the account number and the authorization amount; and
the point-of-sale terminal transmitting the online authorization request to the computer server over the computer network.

14. The method according to claim 9, wherein:
the pre-authorization database includes the one account number stored in association with an offline authorization threshold;
the receiving a plurality of account numbers comprises the computer server receiving the authorization confirmation messages over the computer network;
the updating comprises the computer server (i) generating an updated authorization threshold less than the offline authorization threshold, and (ii) associating the updated authorization threshold with the one account number in the pre-authorization database in replacement of the offline authorization threshold; and
the confirming comprises the point-of-sale terminal confirming that the authorization amount is not greater than the updated authorization threshold.

15. The method according to claim 9, wherein:
the pre-authorization database includes the one account number stored in association with an offline authorization threshold;
the receiving a plurality of account numbers comprises the computer server receiving a plurality of online authorization requests over the computer network, the online authorization requests including the account numbers;
the updating comprises (i) generating an updated authorization threshold greater than the offline authorization threshold, and (ii) associating the updated authorization threshold with the one account number in the pre-authorization database in replacement of the offline authorization threshold; and
the confirming comprises the point-of-sale terminal confirming that the authorization amount is not greater than the updated authorization threshold.

16. The method according to claim 15, wherein the updating further comprises the computer server incorporating the one account number and the updated authorization threshold into an authorization response message, and transmitting the authorization response message over the computer network in response to one of the online authorization requests.

* * * * *